United States Patent
Tang

(10) Patent No.: US 7,990,629 B2
(45) Date of Patent: Aug. 2, 2011

(54) LENS MODULE

(75) Inventor: Zhao-Huai Tang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 224 days.

(21) Appl. No.: 12/277,422

(22) Filed: Nov. 25, 2008

(65) Prior Publication Data

US 2009/0141373 A1 Jun. 4, 2009

(30) Foreign Application Priority Data

Nov. 30, 2007 (TW) .............................. 96222723 U

(51) Int. Cl.
*G02B 7/02* (2006.01)
(52) U.S. Cl. .................................................... 359/811
(58) Field of Classification Search .......... 359/813–814, 359/819, 821–824
See application file for complete search history.

(56) References Cited

U.S. PATENT DOCUMENTS

| 7,262,927 B1* | 8/2007 | Shyu et al. ..................... 359/823 |
| 2006/0028929 A1* | 2/2006 | Osaka ......................... 369/44.14 |
| 2007/0097527 A1* | 5/2007 | Ichikawa et al. .............. 359/819 |

* cited by examiner

*Primary Examiner* — Ricky Mack
*Assistant Examiner* — Vipin Patel
(74) *Attorney, Agent, or Firm* — Thomas|Kayden

(57) ABSTRACT

A lens module includes a base to be fixed, a second elastic sheet fixed in the base, a lens sleeve sliding according to the base, a limiting member installed on the lens sleeve, a first elastic sheet, and an upper cover. The lens module includes a covering board with a central hole installed between the second elastic sheet and the lens sleeve. The diameter of the central hole is greater than the outer diameter of the lens sleeve. The covering board is connected to the base to fix the second elastic sheet on the base. Because the covering board to connect to the base, the second elastic sheet can be fixed on the base for decreasing time-consumption, reliable fixation, and decreasing the rate which the second elastic sheet rotates and is deformed.

4 Claims, 8 Drawing Sheets

LENS MODULE

CROSS REFERENCE TO RELATED APPLICATIONS

This Application claims priority of Taiwan Patent Application No. 96222723, filed on Nov. 30, 2007, the entirety of which is incorporated by reference herein.

BACKGROUND OF THE INVENTION

1. Field of the Invention

The invention relates to a lens module and more particularly to a lens module with a voice coil motor for focusing.

2. Description of the Related Art

In various photographic apparatuses, a motor is usually used as an actuator to drive a lens for focusing. A voice coil motor (VCM) is a cheaper product on the market and is usually applied to photographic apparatuses, for example a cell phone which can takes photos. FIGS. 1-5 are schematic views of conventional lens modules. Shown in FIG. 1, the lens module sequentially includes a base 1, a second elastic sheet 2, an insulating sheet 3, a lens sleeve 4, a limiting assembly 5, a first elastic sheet 6, and an upper cover 7. The base 1 is connected to the upper cover 7 to form a space for accommodating other elements. The lens sleeve 4 is slidably installed in the space, and comprises a coil and a central hole for fixing the lens. The limiting assembly 5 is installed on the lens sleeve 4, and comprises a magnet therein. The coil respectively connects to opposite end portions of the second elastic sheet 2. The second elastic sheet 2 is respectively electrically connected to the positive and negative electrodes via wiring terminals 8 and 9. After electrifying, the electromagnetic force drives the lens sleeve 4 to link the lens to move upward and downward for focusing. The first elastic sheet 6 and the second elastic sheet 2 respectively generate opposing resistances for the lens sleeve 4 to balance the electromagnetic force.

During assembly, the coil of the lens sleeve 4 is connected to the second elastic sheet 2. Then, the base 1, the insulating sheet 3, the limiting cover 5, the first elastic sheet 6, and the upper cover 7 are sequentially assembled. Each element, especially the first elastic sheet 6 and the second elastic sheet 2, are fixed on different members. Thus, cumulative inaccuracies exist and coaxality is difficult. Additionally, the second elastic sheet 2 is engaged with the base 1. Thus, because the fixing method is unreliable, the second elastic sheet 2 easily rotates and deforms.

Referring to FIG. 2, to effectively fix the second elastic sheet 2, some lens modules comprise a plurality of fixing members 10 on an outer edge of the second elastic sheet 2. The base 1 comprises a plurality of holes 11. When the second elastic sheet 2 is assembled with the base 1, the holes 11 are filled with the adhesive, and then the fixing members 10 are inserted. Thus, the second elastic sheet 2 is connected to the base 1. Such connecting method is complex, drying time of the adhesive costs time, and assembly yield decreases.

Referring to FIG. 5, when the lens is assembled with a holder 15, the holder 15 rotates, thus decreasing assembly yield. Thus, the holder 15 comprises a plurality of radial protrusions 18 on the outer edge, and the base 17 comprises a plurality of grooves 19 on the inner edge corresponding to the radial protrusions 18 for ensuring that the holder is fixed during lens assembly. Such a structure prevents the holder 15 from rotating with the base 17. However, lens module volume increases for such a structure. Thus, miniaturization trends of cameras and cell phones with cameras are hindered.

BRIEF SUMMARY OF THE INVENTION

The invention solves the problem is that to fix the second elastic sheet costs much time, and assembly yield is decreased. Although the conventional lens module can prevent from unwanted rotation during assembling the lens, however, the greater volume is a defect. The invention provides a lens module, wherein the second elastic sheet is easily assembled and assembly yield is increased, unwanted rotation is prevented and volume is decreased.

The invention provides a lens module for solving the above problems. The lens module comprises a base to be fixed, a second elastic sheet fixed in the base, a lens sleeve sliding according to the base, a limiting member installed on the lens sleeve, a first elastic sheet, and an upper cover. The lens module comprises a covering board installed between the second elastic sheet and the lens sleeve. The covering board has a central hole. The diameter of the central hole is greater than the outer diameter of the lens sleeve. The lens sleeve comprises an inner tube with a central hole. A coil is installed on the outer edge of the lens sleeve and a plurality of grooves is installed therebetween. The limiting member comprises a plurality of magnetic limiting portions extended downward. The magnetic limiting portions correspond to the grooves. The covering board is connected to the base to fix the second elastic sheet on the base.

In the lens module of the invention, the covering board comprises a plurality of fixing pillars to extend downward, and the base comprises a plurality of fixing holes corresponding to the covering board.

In the lens module of the invention, the second elastic sheet comprises a plurality of fixing holes or apertures corresponding to the fixing pillars of the covering board.

In the lens module of the invention, the base comprises a plurality of studs. The studs comprise a plurality of fixing pillars on the top of the studs. The first elastic sheet and the upper cover comprise a plurality of fixing holes corresponding to the base. The fixing pillars of the base correspond to the fixing holes of the upper cover for connection.

In the lens module of the invention, the covering board comprises a plurality of studs. The studs comprise a plurality of fixing pillars on the top of the studs. The first elastic sheet and the upper cover comprise a plurality of fixing holes corresponding to the base. The fixing pillars of the covering board correspond to the fixing holes of the upper cover for connection.

In the lens module of the invention, the studs are installed on four corners of the base. Two long studs are installed at two diagonal corners. The two short fixing pillars are installed on the top of the long studs. Two short studs are installed at the other two diagonal corners. The two long fixing pillars are installed on the top of the short studs. An extending portion is installed on the bottom of the upper cover and the two diagonal corners with the long fixing pillars. The fixing holes of the upper cover pass through the extending portion and correspond to the long fixing pillars.

In the lens module of the invention, the first elastic sheet and the diagonal corners corresponding to the long fixing pillars of the base comprise a chamfer or a gap.

In the lens module of the invention, the studs are installed at four corners above the covering board. Two long studs are installed at two diagonal corners. The two short fixing pillars are installed on the top of the long studs. Two short studs are installed at the other two diagonal corners. The two long fixing pillars are installed on the top of the short studs. An extending portion extends downward on the bottom of the upper cover and at diagonal corners with the long fixing pillars. The fixing holes of the upper cover pass through the extending portion and correspond to the long fixing pillars.

In the lens module of the invention, the outer edge of an inner tube is connected to the inner edge of a ring via the connecting points therebetween. A groove is generated between the connecting points.

In the lens module of the invention, the interval is 0.1 mm.

In the lens module of the invention, the lens module further comprises a covering board installed on the second elastic sheet. The bottom of the covering board comprises a plurality of fixing pillars. The base and the second elastic sheet respectively comprise a plurality of first fixing holes and second fixing holes.

The lens module of the invention has advantages as follows. Because the covering board for connecting to the base is added, the second elastic sheet can be fixed on the base. The magnetic limiting portions of the limiting member corresponding to the grooves of the lens sleeve prevent the lens sleeve from rotating during assembly of the central hole of the lens sleeve with the lens. Compared with the conventional lens module, less time is required for assembly of the lens module of the invention. Additionally, the fixation of the lens module of the invention is more reliable. Also, degree of deformation of the interval between the magnetic limiting portions and the grooves is decreased. Moreover, degree of rotation resulting in the deformation of the second elastic sheet connected to the coil is decreased. Also, the structure of the lens module for preventing rotation occupies lesser space and is easily assembled. Thus, the rate in which the second elastic sheet rotates and is deformed decreases.

The invention can be more fully understood by reading the subsequent detailed description and examples with references made to the accompanying drawings, wherein:

DETAILED DESCRIPTION OF THE INVENTION

Figure 1:
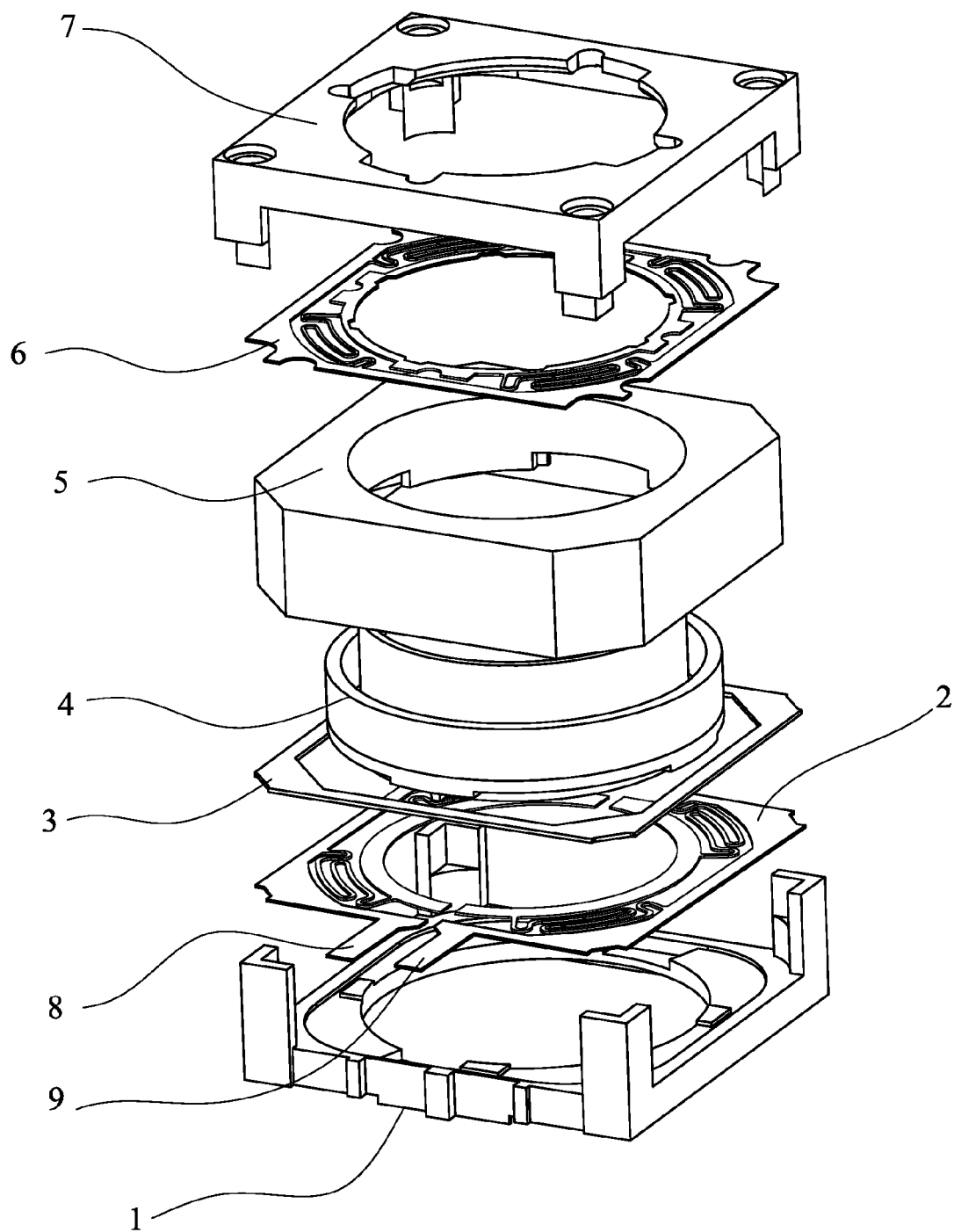
FIG. 1 is an exploded view of a conventional lens module.
Figure 2:
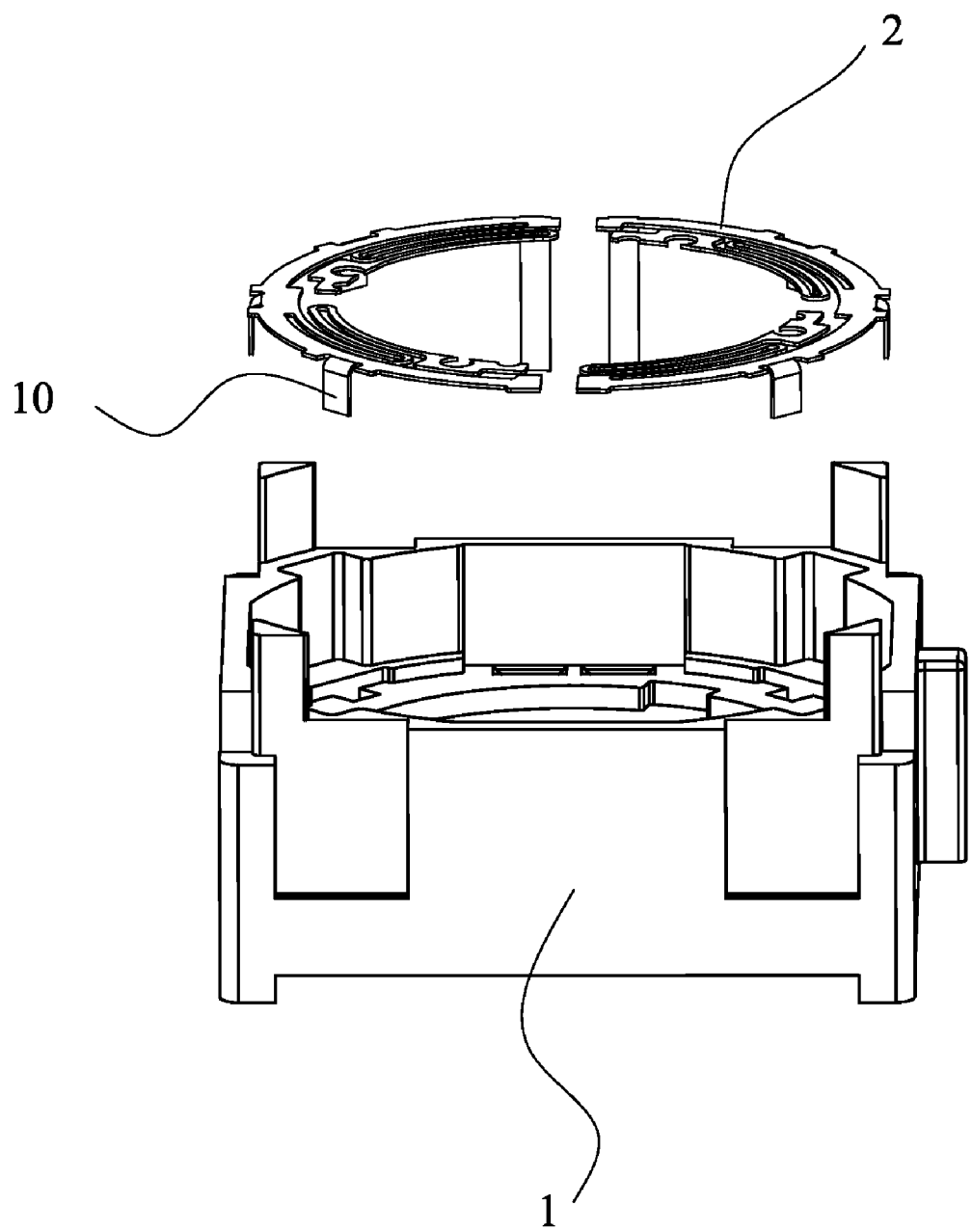
FIG. 2 is an exploded view of a base and a second elastic sheet of a conventional lens module.
Figure 3:
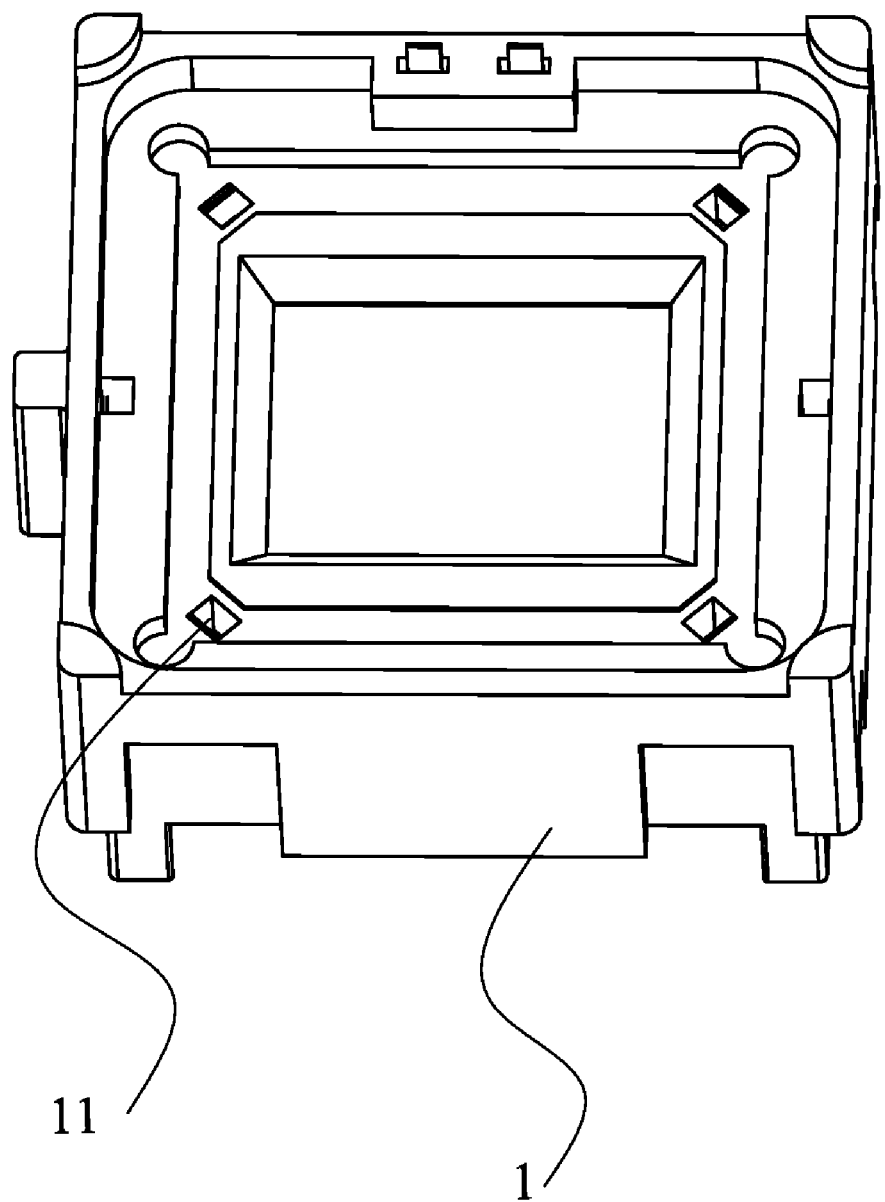
FIG. 3 is a vertical view of a base of a conventional lens module.
Figure 4:
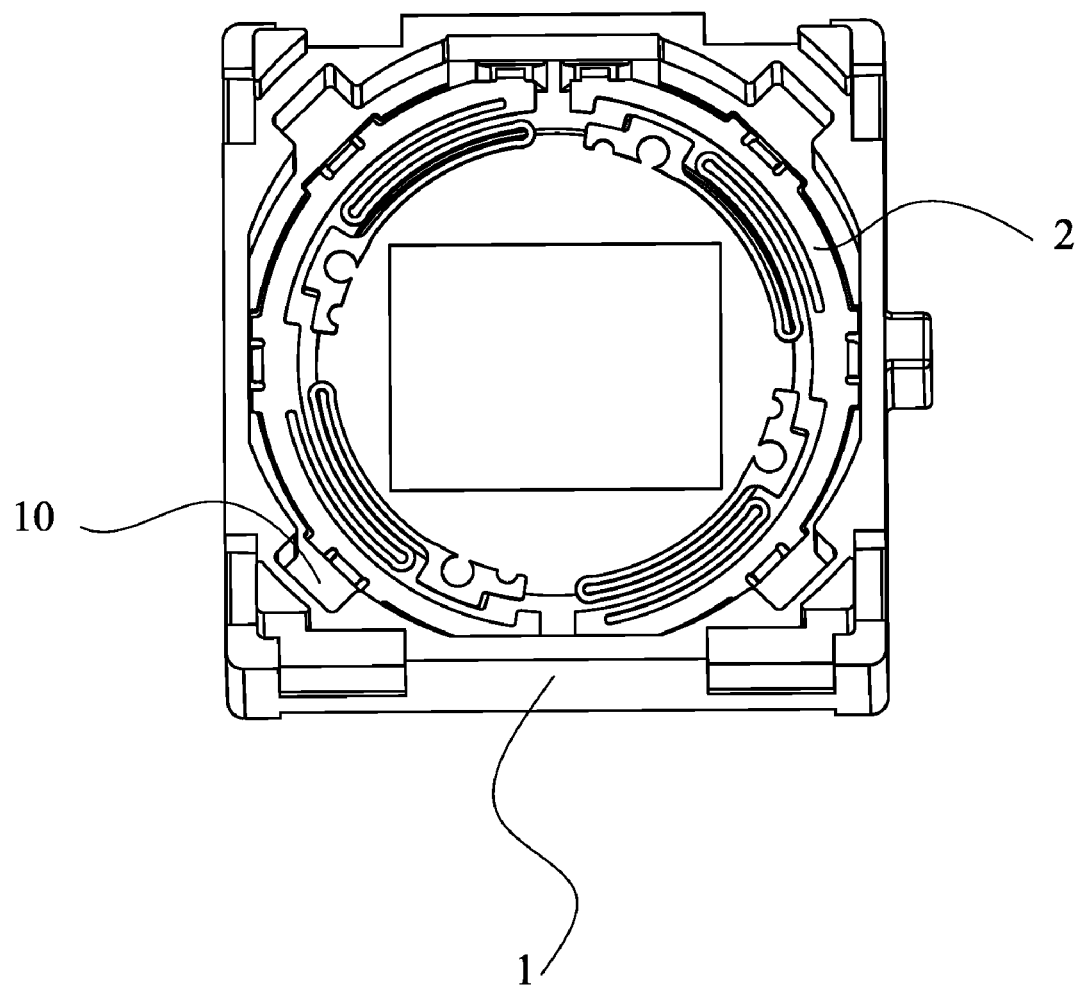
FIG. 4 is a vertical view showing assembly of the base and the second elastic sheet in FIG. 2.
Figure 5:
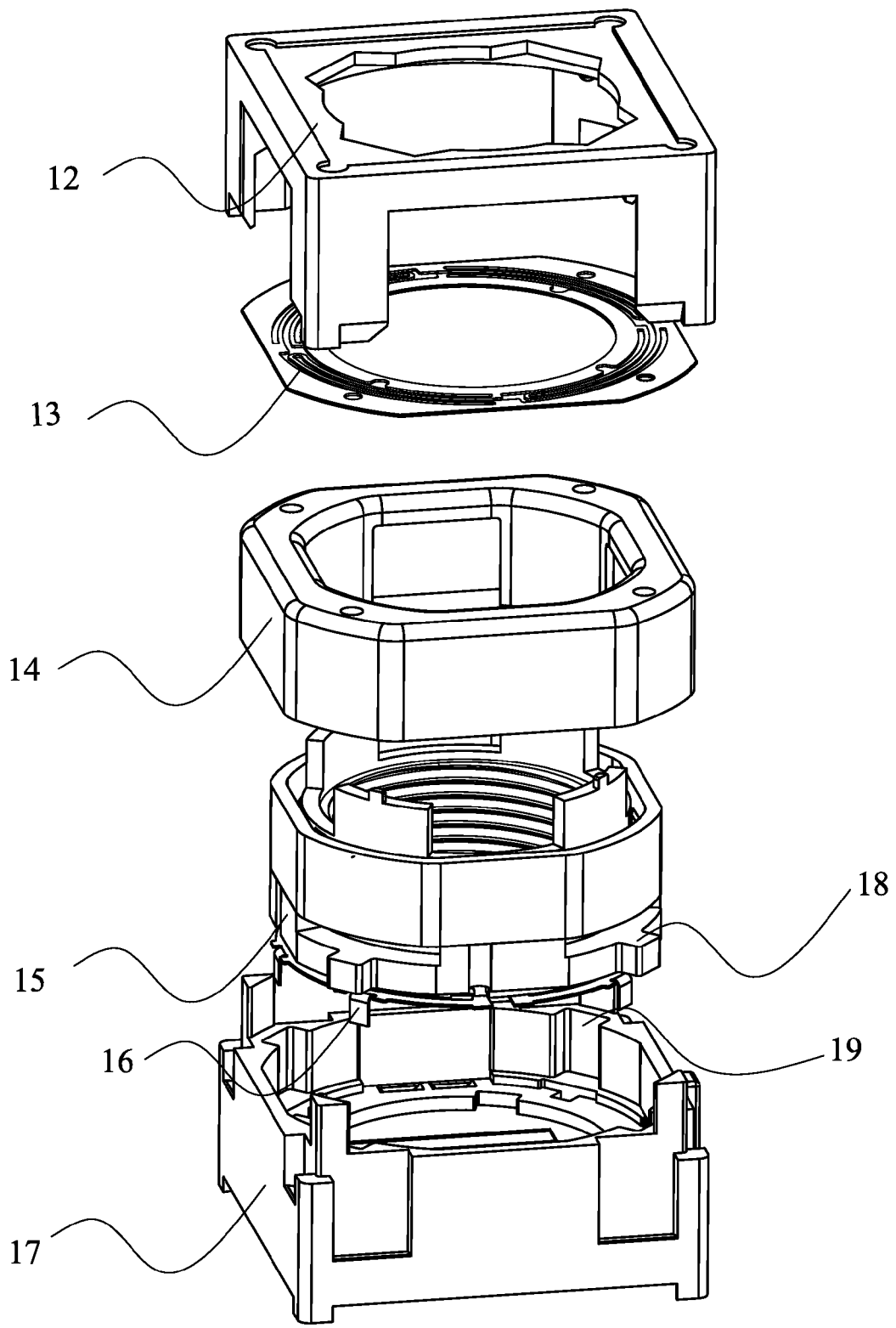
FIG. 5 is an exploded view showing how a lens module of the invention prevents rotation.
Figure 6:
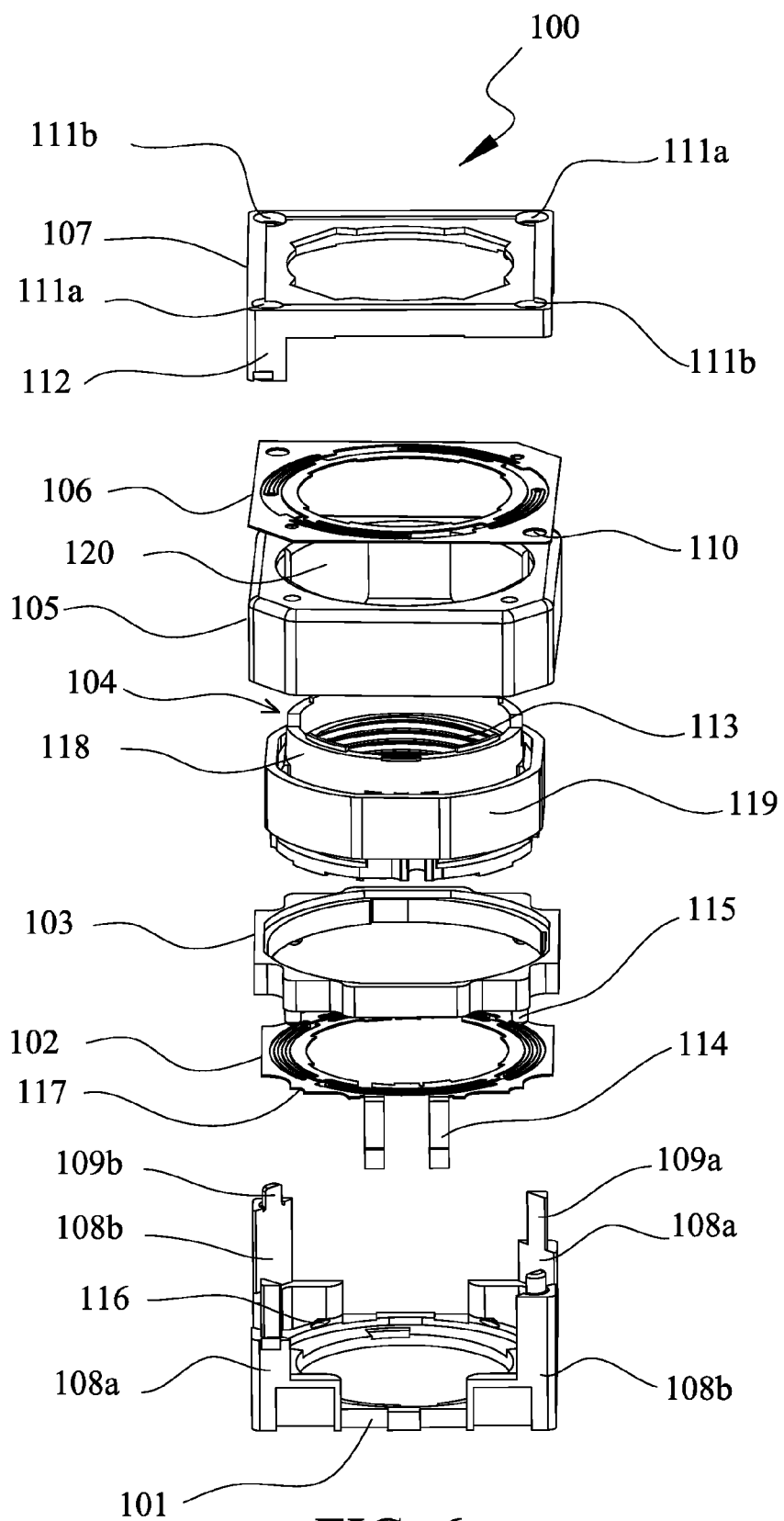
FIG. 6 is an exploded view showing a lens module of an embodiment of the invention.
Figure 7:
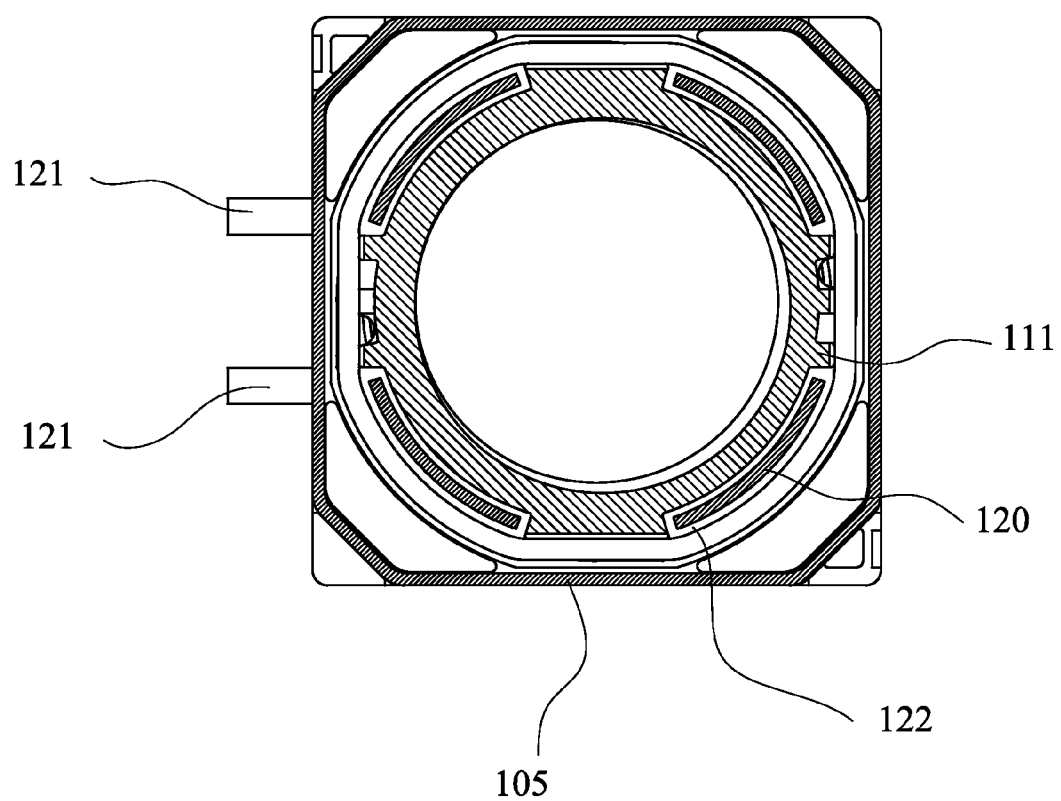
FIG. 7 is a cross-section view showing a lens module of the invention.

FIG. 6 is an exploded view of an embodiment of the invention. Referring to FIG. 6, a lens module 100 comprises a base 101 to be fixed, a second elastic sheet 102, a lens sleeve 104 sliding according to the base 101, a limiting member 105 installed on the lens sleeve 104, a first elastic sheet 106, and an upper cover 107. A plurality of studs 108a and 108b are installed on four corners of the base 101. A plurality of fixing pillars 109a and 109b are installed on the top of the studs 108a and 108b. The first elastic sheet 106 and the upper cover 107 comprise a plurality of fixing holes 110 and 111a-b corresponding to the fixing pillars 109a and 109b. The base 101 is connected to the upper cover to form a space for accommodating other elements and to adhere to the first elastic sheet 106 to the upper cover 107. The lens sleeve 104 comprises an inner tube 118. A coil 119 is installed on the outer edge of the inner tube 118. The inner tube 118 comprises a central hole 113. The inner diameter of the central hole 113 matches the outer diameter of the lens. The central hole 113 is engaged with the lens via the inner thread for fixing the lens. Referring to FIGS. 6 and 7, the outer edge of the inner tube 118 is connected to the inner edge of the coil via connecting points 111 with average intervals. A groove is generated between the connecting points 111.

Referring to FIG. 6, to stably assemble the base 101 with the upper cover 107, the studs 108a installed at two diagonal corners of the base 101 are obviously shorter than the studs 108b installed at the other two diagonal corners. The fixing pillars 109a on the studs 108a are greater than the fixing pillars 109b on the studs 108b. For even force, the sum of the lengths of the studs and the fixing pillars at each corner are the same. An extending portion 112 extends downward from the bottom of the upper cover 107 and diagonal corners corresponding to the long fixing pillars 109a. The fixing holes 111a of the upper cover 107 pass through the extending portion 112. The first elastic sheet 106 and the diagonal corners corresponding to the long fixing pillars 109a comprise a chamfer or a gap to prevent the extending portion 112 of the upper cover 107 from interference during assembly. When the base 101 is connected to the upper cover 107, the long fixing pillars 109a correspond to the fixing holes 111a on the extending portion 112 of the upper cover 107, and the short fixing pillars 109b correspond to the fixing holes 110 of the first elastic sheet 106 and the fixing holes 111b corresponding to the upper cover. Because the lengths of the fixing pillars and the fixing holes are increased, the connection is secure.

The second elastic sheet 102 is installed in the base 101. To fix the second elastic sheet 102, a ring-shaped covering board 103 is installed between the lens sleeve 104 and the second elastic sheet 102. The covering board 103 comprises a central hole. The diameter of the central hole is greater than the outer diameter of the lens sleeve 104. The bottom of the covering board 103 comprises a plurality of downward extending fixing pillars 115. The base 101 comprises a plurality of corresponding fixing holes 116. The second elastic sheet 102 comprises a plurality of corresponding fixing holes or a gap 117. The fixing pillars 115 of the covering board 103 pass through the fixing holes or gap 117 and the fixing holes 116 to connect to the base 101, and the second elastic sheet 102 is fixed on the base 101.

In this embodiment, the covering board 103 is added, and the covering board 103 is connected to the base 101. Thus, the second elastic sheet 102 is fixed on the base 101. Compared with the conventional lens module, less time is required for assembly of the lens module of the invention. Additionally, the fixation of the lens module of the invention is secure. Also, the rate in which the second elastic sheet 102 rotates and is deformed is decreased.

Although the above embodiment provides a covering board 103, so that elements may be assembled with the base 101, other methods may be provided so that elements may be assembled with the base 101. One method sets a plurality of studs with a plurality of third fixing pillars on the top thereof on the base 101. In this case, the second elastic sheet 102 is fixed on the base via an adhesive. The lens sleeve 104 and the limiting member 105 are installed in the base. Thus, the first elastic sheet 106 and the upper cover 107 pass through a fixing hole to connect to the third fixing pillar of the base 101 for achieving the same purpose.

During assembly, the elements are sequentially assembled, and the elements are fixed between the base 101 and upper cover 107. The magnetic limiting portions 120 of the limiting member 105 correspond to the grooves 122 of the lens sleeve 104. An interval exists between the magnetic limiting portions 120 and the grooves 122. When the lens is assembled with the central hole 113 of the lens sleeve 104, the lens sleeve 104 rotates and is deformed in the interval. The degree of deformation is decreased. Moreover, degree of rotation resulting in the deformation of the second elastic sheet connected to the coil is decreased. Also, the rotating prevention structure of the voice coil motor occupies lesser space and is easily assembled for saving assembly time.

Figure 8:
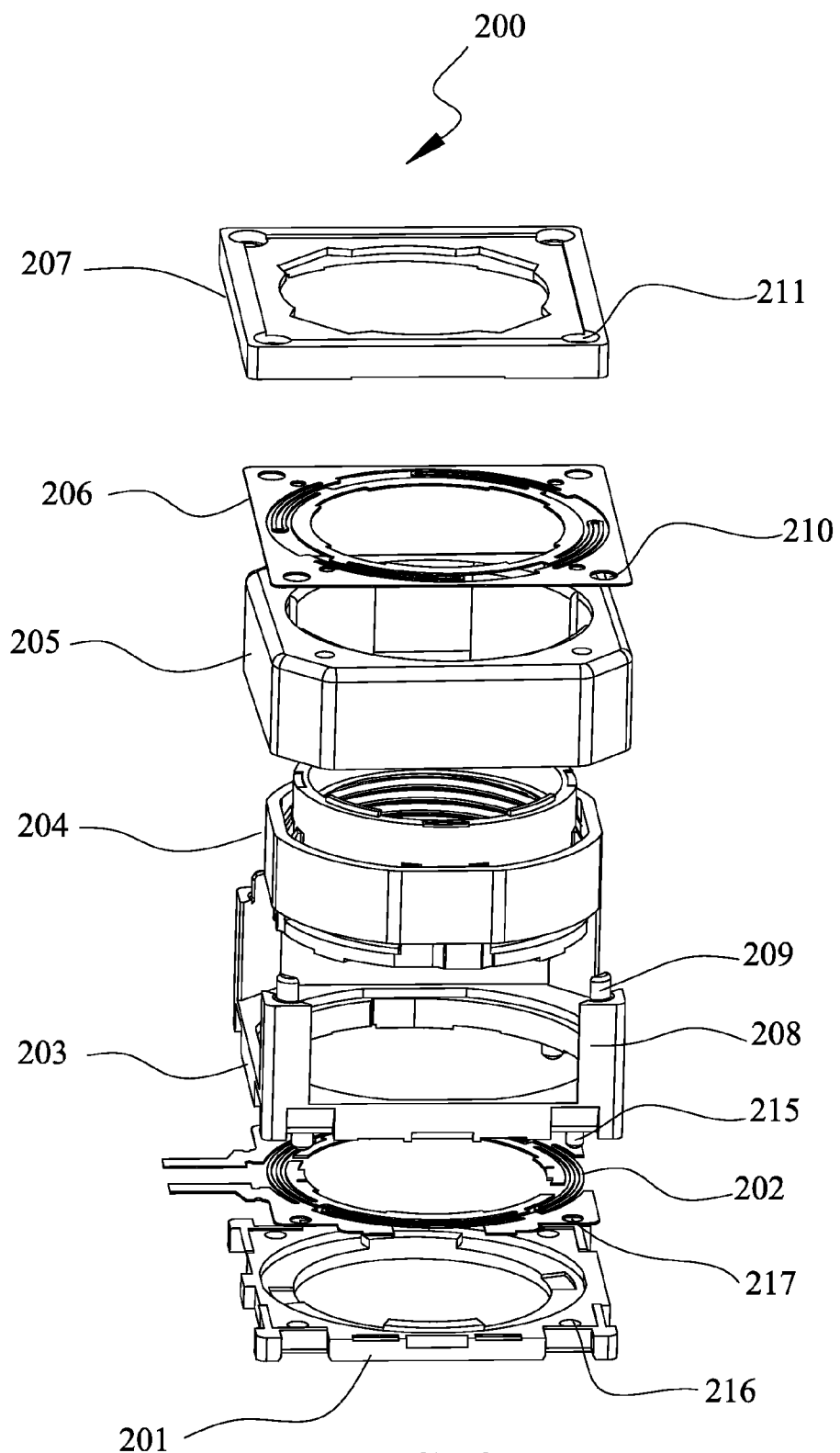
FIG. 8 is an exploded view showing a lens module of another embodiment of the invention.

FIG. 8 is an exploded view of another embodiment of the lens module of the invention. The descriptions which are the same as the above embodiment are omitted for brevity. Referring to FIG. 8, the lens module 200 comprises a base 201 to be fixed, a second elastic sheet 202, a lens sleeve 204 sliding according to the base 201, a limiting member 205 installed on the lens sleeve 204, a first elastic sheet 206, and an upper cover 207. The base 201 is connected to the upper cover 207 via a covering board 203.

The base 201 comprises a main body. A plurality of studs 208 are installed at four corners of the top surface of the covering board 203. The outer edge of the limiting member 205 is engaged between the studs 208. The cross-section of the studs 208 is triangle to prevent the limiting member 205 from rotation. The top end of the studs 208 comprises a plurality of fixing pillars 209. The first elastic sheet 206 and the upper cover 207 comprise a plurality of fixing holes 210 and 211. The fixing pillar 209 corresponds to the fixing holes 210 and 211 to connect the upper cover 207 to the base 201. The first elastic sheet 206 is fixed between the limiting member 205 and the upper cover 207.

The bottom of the covering board 203 comprises a plurality of downward extending fixing pillars 215. The base 201 comprises a plurality of corresponding fixing holes 216. The second elastic sheet 202 comprises a plurality of corresponding fixing holes or a gap 217. The fixing pillars 215 under the covering board 203 correspond to the fixing holes or gap 217 and fixing holes 216 to connect to the base 201. Thus, the second elastic sheet 202 is fixed on the base 201.

The installation of the studs 208 and the fixing pillars 209 on the covering board 203 of this embodiment are similar to that of the above embodiment. Two long studs are installed at two diagonal corners. Two short fixing pillars are installed on the top of the long studs. Two short studs are installed at the other two diagonal corners. The two long fixing pillars are installed on the top of the short studs. An extending portion extends downward on the bottom of the upper cover 207 and at diagonal corners with the long fixing pillars. The fixing holes 211 of the upper cover 207 pass through the extending portion and correspond to the long fixing pillars. The first elastic sheet 206 and the diagonal corners corresponding to the long fixing pillars comprise a chamfer or a gap to correspond with the extending portion of the upper cover 207. When the base 201 is connected to the upper cover 207, the long fixing pillars correspond to the fixing holes in the extending portion of the upper cover 207. Because the lengths of the fixing pillars and the corresponding fixing holes are increased, the connection is secure.

In this embodiment, the covering board 203 provides a second elastic sheet 102 to be stably fixed on the base 101 to decrease assembly time required and rate which the second elastic sheet rotates and is deformed. The elements based on the covering board 203 are installed above and under the covering board 203 to ensure coaxality of the elements, especially coaxality of the first elastic sheet 206 and the second elastic sheet 202. Thus, the quality of the motor increases.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens module, comprising:
   a lens sleeve, comprising an inner tube, wherein a lens space is formed by the inner tube, and a main axle passes through the lens space and is parallel to the inner tube;
   a coil, installed on the inner tube, wherein a plurality of grooves is formed between the coil and the inner tube;
   a covering board, comprising a central hole and a plurality of extending fixing pillars extending parallel to the main axle, wherein the diameter of the central hole is greater than the outer diameter of the lens sleeve;
   a second elastic sheet, comprising a plurality of apertures corresponding to the covering board and a gap;
   a limiting member, comprising an opening and a plurality of magnetic limiting portions, wherein the magnetic limiting portions extend parallel to the main axle from an inner edge of the opening of the limiting member; and
   a base, connected to the covering board and comprising a plurality of fixing holes, wherein the covering board holds the lens sleeve and connects to the limiting member, the magnetic limiting portions are correspondingly installed in the grooves and the second elastic sheet is fixed on the base via the covering board, and the extending fixing pillars of the covering board pass through the gap of the second elastic sheet and the fixing holes of the base to connect to the base.

2. The lens module as claimed in claim 1, further comprising a first elastic sheet with a plurality of fixing holes, wherein the base comprises a plurality of fixing pillars corresponding to the fixing holes, and the fixing pillars protrudes outward from the bottom of the covering board.

3. The lens module as claimed in claim 1, wherein the base comprises a plurality of fixing pillars and a first elastic sheet and an upper cover respectively comprise a plurality of fixing holes corresponding to the fixing pillars, the covering board comprises a plurality of apertures corresponding to the fixing pillars and the fixing holes, and the fixing pillars of the base pass through the apertures of the covering board, the fixing holes of the first elastic sheet, and the upper cover to connect to the upper cover.

4. The lens module as claimed in claim 2, wherein the apertures of the second elastic sheet correspond to the fixing pillars of the base.

* * * * *